E. COLSON.
SAW TOOTH.
No. 96,674. Patented Nov. 9, 1869.
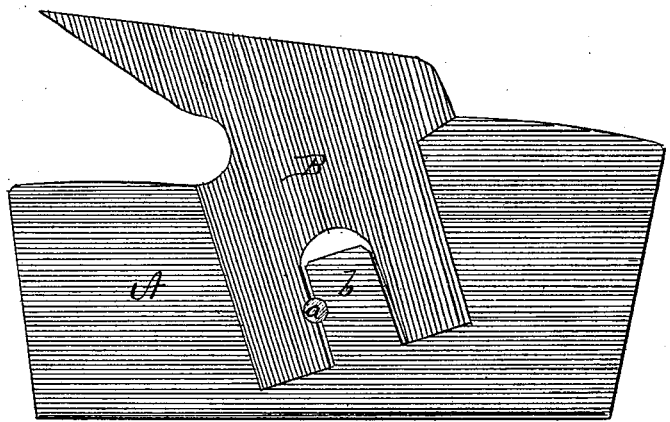
Witnesses
F. Lehmann
C. L. Evers
Inventor
E. Colson
Alexander & Mason
Attys

United States Patent Office.

EDWARD COLSON, OF FORT WAYNE, INDIANA.

Letters Patent No. 96,674, dated November 9, 1869.

---

IMPROVEMENT IN SAW-TEETH.

---

The Schedule referred to in these Letters Patent and making part of the same.

---

*To all whom it may concern:*

Be it known that I, EDWARD COLSON, of Fort Wayne, in the county of Allen, and in the State of Indiana, have invented certain new and useful Improvements in Saws; and do hereby declare that the following is a full, clear, and exact description thereof, reference being had to the accompanying drawings, and to the letters of reference marked thereon, making a part of this specification.

The nature of my invention consists in so constructing the saw-plate and the teeth, that when striking rivets, to fasten the teeth, direct pressure is disconnected from the saw-plate, thereby avoiding the springing of the saw while riveting them.

In order to enable others skilled in the art to which my invention appertains, to make and use the same, I will now proceed to describe its construction and operation, referring to the annexed drawing, which represents a side view of a saw-tooth, with a portion of the saw-plate.

A represents a portion of the saw-plate, having a recess, in which the tooth B is inserted.

Projecting upward from the saw-plate, in about the centre of the recess mentioned, is a lip or tongue, *b;* and the base of the tooth B is provided with a recess, or cut out, so as to admit the tongue or lip *b,* said recess being, however, larger than the tongue, for a purpose that will be hereinafter described.

The tooth B is fastened by means of the rivet *a,* which enters small notches in the base of the tooth and the tongue *b.*

The great objections are, and always have been, that all saw-teeth fastening with rivets will spring the saws while riveting them, which renders them unfit for use until straightened all over again, and this is a great trouble and expense to the manufacturer.

The device above described overcomes all objections herein stated, and, at the same time, fastens the teeth with rivets.

The reason why I choose to overcome all the aforesaid objections, and, at the same time, fasten with rivets, is, because it has become next to impossible to insert teeth without rivets, and make them durable.

My invention is that of allowing a projection of the saw-plate to run up in the base-part of the tooth sufficiently high and stiff enough to allow a rivet to be applied, and, at the same time, disconnect the said projection of saw-plate from the tooth, thereby allowing it to spring when rivets are applied, and still sufficiently strong to hold the tooth in the plate, as by riveting the usual way; and by these means, I disconnect the pressure caused by riveting from the saw-plate, and leave it on the said projection or tongue, thereby enabling me to rivet teeth in saw-plates without springing the saw in the least.

It will be observed that the disconnection of said tongue on the back part of the tooth is where the invention lies, because, if I were to apply two rivets on said projection, instead of one, the whole object would be defeated.

I am aware that saw-teeth have been made with two downward-projecting tongues, secured to an upward-projecting tongue of the saw-plate by a rivet; hence I do not broadly claim such as my invention.

Having thus fully described my invention,

What I claim as new, and desire to secure by Letters Patent, is—

A saw-tooth, having two downward-projecting tongues, secured to a saw-blade, having an upward-projecting tongue, by a rivet, when there is a space left entirely around the tongue *b,* as and for the purposes set forth.

In testimony that I claim the foregoing, I have hereunto set my hand, this 23d day of August, 1869.

EDWARD COLSON.

Witnesses:
W. J. KERR,
S. E. SINCLAIR.